United States Patent [19]

Stewart

[11] 4,355,009

[45] Oct. 19, 1982

[54] SEPARATIVE TREATMENT OF ZINC-BEARING FLUE DUST

[75] Inventor: Maxson L. Stewart, Bremen, Ga.

[73] Assignee: Southwire Company, Carrollton, Ga.

[21] Appl. No.: 154,345

[22] Filed: May 29, 1980

[51] Int. Cl.$^3$ .............................................. C01G 9/06
[52] U.S. Cl. .................................. 423/101; 423/106; 423/103; 423/104; 423/109
[58] Field of Search .................. 423/42, 43, 101, 104, 423/106, 109

[56] References Cited

U.S. PATENT DOCUMENTS 2,264,337 12/1941 Sequine ............................... 423/109
3,149,149 9/1964 Gorman ............................ 260/438.1
4,005,174 1/1977 Bodson .................................. 423/43

FOREIGN PATENT DOCUMENTS 1366380 11/1974 United Kingdom .

OTHER PUBLICATIONS

Davey et al., "Removal of Iron from Leach Liquors by the Goethite Process" *Hydrometallurgy*, vol. 2, No. 1, Jul. 1976, pp. 25-33.
Gordon et al., in *Metallurgical Transactions B* vol. 6B, Mar. 1975, pp. 43-53.
Habashi, F., *Principles of Extractive Metallurgy*, vol. 2, Gordon and Breach, N.Y., (1970), pp. 175, 176.

*Primary Examiner*—Brian E. Hearn
*Attorney, Agent, or Firm*—Herbert M. Hanegan; Stanley L. Tate; Robert S. Linne

[57] ABSTRACT

A hydrometallurgical process is provided for separative treatment of zinc-bearing metallurgical flue dust containing significant amounts of lead, chlorine, and iron. The process is especially suited for extraction of zinc sulfate from blast furnace white dust resulting in the smelting of secondary copper. According to the process, the flue dust is leached in sulfuric acid solution for substantially complete dissolution of soluble constituents, notably zinc, leaving insoluble residue consisting principally of lead oxide. At completion of leaching, pH is selectively adjusted corresponding to the desired extent of subsequent chloride removal. Second, the loaded leach solution is treated for chloride removal wherein chloride ion concentration is substantially and selectively reduced by precipitation of cuprous chloride, cuprous ions being provided by pH regulated reduction of cupric ions. Third, the dechlorinated leach solution is treated by pH regulated cementation with zinc to remove residual cupric copper from the previous step along with other metal impurities more noble than zinc. Fourth, iron is precipitated from the acidic leach solution by oxidation of acid-soluble ferrous ions to the relatively insoluble ferric state. Finally, the purified leach solution is subjected to evaporative crystallization to recover commercial grade zinc sulfate.

15 Claims, 1 Drawing Figure

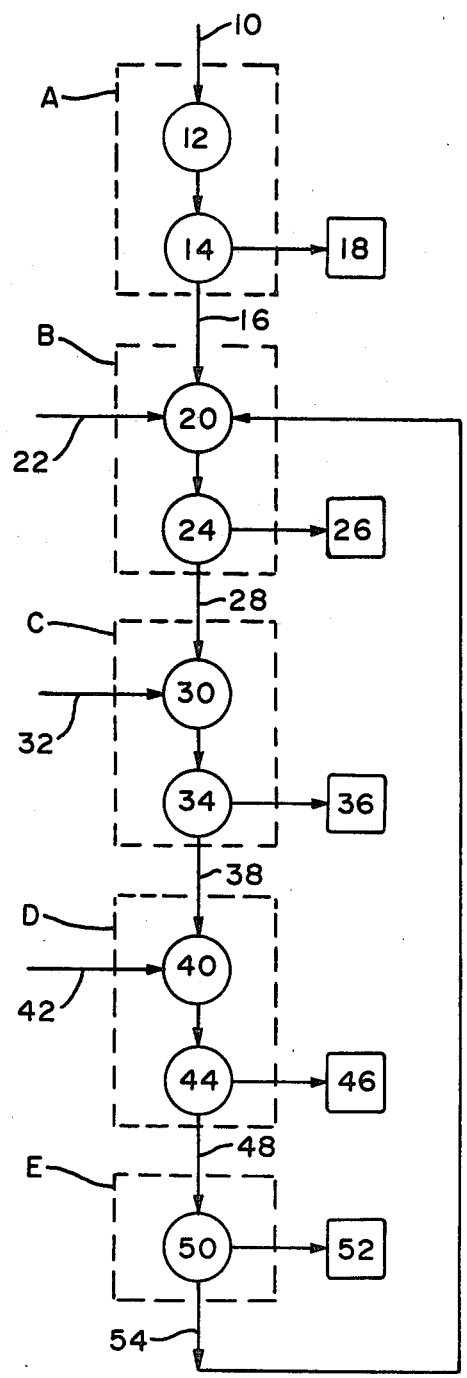

SEPARATIVE TREATMENT OF ZINC-BEARING FLUE DUST

BACKGROUND OF THE INVENTION

This invention relates generally to hydrometallurgical separation of metal values from zinc-bearing metallurgical flue dust and relates specifically to extraction of zinc sulfate from flue dust resulting in the smelting of secondary copper.

Flue dust resulting in the blast furnace smelting of secondary copper typically contains as its principal constituent zinc oxide due to the prevalent association of zinc-containing scrap with copper-containing scrap and is frequently termed "white dust". The present invention is especially concerned with recovery of zinc as sulfate from such dust, which requires for commercial purity standards that particularly objectionable elements be removed, such as chlorine, lead, and iron.

According to conventional practice, extraction of zinc sulfate from zinc-bearing waste, such as white dust, is accomplished essentially by the steps of sulfuric acid leaching and relatively complex liquid-liquid extraction, as representatively shown in U.K. Pat. No. 1,366,380 "Process for Treating Chloride-Containing Zinc Waste" issued Sept. 11, 1974, hereby incorporated by reference. In contrast, the present invention provides an alternative treatment of enhanced practicality, wherein impurities are serially precipitated leaving a substantially pure zinc sulfate solution from which is crystallized commercial grade zinc sulfate.

Of interest in the present invention concerning removal of chlorine is the process disclosed in U.S. Pat. No. 4,005,174 "Process for the Elimination of Chloride from Zinc Sulphate Solutions" issued Jan. 25, 1977, hereby incorporated by reference, wherein chlorine is removed from zinc sulfate solution by pH regulated precipitation of cuprous chloride.

SUMMARY OF THE INVENTION

Accordingly, a hydrometallurgical process is provided for separative treatment of zinc-bearing metallurgical flue dust containing significant amounts of lead, chlorine, and iron. The process is especially suited for extraction of zinc sulfate from flue dust resulting in the smelting of copper and most especially secondary copper. The process comprises the following steps:

(a) providing as a starting material a zinc-bearing flue dust containing significant amounts of lead, chlorine, and iron;

(b) leaching said starting material in sulfuric acid solution of concentration at least about sufficient for substantially complete dissolution of soluble metal oxide constituents; then selectively adjusting the pH of the loaded leach solution to at least a sufficiently acidic condition corresponding to the selected extent of subsequent chloride removal; and separating undissolved residue from the leach solution; then (c) removing chloride from said leach solution to selected extent corresponding to said selected acidic pH by precipitating cuprous chloride, cuprous ions being provided in at least stoichiometric amount by reduction in deoxidized solution of cupric ions with metallic copper, the ratio of metallic copper to cupric copper being at least about 1; and after sufficient reaction time separating precipitate from the leach solution; then (d) cementing residual copper from said solution with zinc powder; then (e) precipitating iron from said solution by the addition of an oxidant and a neutralizer in at least about stoichiometric amounts while maintaining pH of said solution acidic; followed by separating precipitate from said solution; and then (f) crystallizing zinc sulfate from said solution.

BRIEF DESCRIPTION OF THE DRAWING

Further details are given below with reference to the accompanying flowchart, illustrating a preferred mode of the invention.

DESCRIPTION OF THE PREFERRED EMBODIMENTS

Referring more particularly to the flowchart, it is seen that the overall process of the invention may be divided broadly into five basic operations, as indicated by dashed circumscriptions A through E. In Unit A, flue dust is leached in sulfuric acid solution for substantially complete dissolution of soluble constituents, notably zinc. In Unit B, the loaded leach solution is substantially dechlorinated by precipitation of cuprous chloride. In Unit C, residual copper is cemented from the dechlorinated leach solution. In Unit D, iron is precipitated from the acidic leach solution by oxidation of acid-soluble ferrous ions. In Unit E, the purified leach solution is treated by evaporative crystallization to recover zinc sulfate.

Zinc-bearing flue dust at 10 is introduced into the extraction process to eventually recover commercial grade zinc sulfate. As discussed above, an especially appropriate starting material is white dust resulting in the smelting of copper, especially secondary copper, characterized by a large percentage content of zinc oxide. A representative white dust was found to contain about 52% zinc oxide, 16% lead oxide, 10% chlorine, 4% copper, 1% ferrous oxide, and various minor constituents.

In Unit A, the flue dust is leached in sulfuric acid solution at 12 for substantially complete dissolution of soluble metal oxide constituents, notably zinc oxide, leaving insoluble residue consisting principally of lead oxide. A representative equation of dissolution is as follows:

$$ZnO + H_2SO_4 = ZnSO_4 + H_2O \tag{1}$$

The quantity of acid is stoichiometrically sufficient for dissolution and further sufficient to render the pH of the solution at completion of leaching sufficiently acidic as required by the subsequent chlorine removal step (Unit B discussed below). Thus, practically, leaching may be said to be pH regulated, i.e. leaching is terminated upon pH being stabilized at an acidic reference value. For downward adjustment of pH, additional acid may be added, and for upward adjustment additional dust may be added. Typically, initial acid concentration will be about 100–300 g/l. Suitably, sulfuric acid may be recycled from electrorefining of copper. Preferably, leach solution volume and acid concentration, relative to the quantity of flue dust treated, are selected so as to tend to maximize the concentration of solubilized zinc sulfate to facilitate subsequent crystallization (Unit E discussed below). After sufficient contact time and final pH adjustment, the loaded leach solution and insoluble residue are separated at 14 by conventional solid-liquid separation, such as filtration. The clarified leach solution at 16 is passed to Unit B for chlorine removal. The residue at 18 containing substantially all the lead oxide initially present may optionally be treated to obtain high purity lead carbonate by the process disclosed in U.S. Pat. No. 2,950,964 "Production of Lead" issued Aug. 30, 1960. To illustrate the foregoing leaching step, 300 grams of the white dust sample material noted above were leached in 1 liter of sulfuric acid solution of about 175 g/l concentration. Leaching was substantially complete after a contact time of about 0.5 hour, with a final pH of about 2. The solution was filtered. Analylsis showed the filtrate to contain about 95% of the zinc initially present, while the residue contained substantially all the lead oxide initially present.

In Unit B, the loaded leach solution is treated for chloride removal at 20 wherein chloride ion concentration is substantially reduced by precipitation of cuprous chloride. Generally, cuprous ions are provided in at least stoichiometric amount from reduction of cupric ions in solution by metallic copper powder, according to the following equations:

$$Cu^{+2} + Cu^\circ = 2Cu^+ \tag{2}$$

$$Cu^+ + Cl^- = CuCl_{(ppt)} \tag{3}$$

As shown in U.S. Pat. No. 4,005,174 "Process for the Elimination of Chlorine from Zinc Sulphate Solutions", referenced above, there is an inverse relation between residual chloride ion concentration and residual cupric ion concentration, cupric concentration increasing as pH decreases. Thus, by selective pH adjustment, residual chloride concentration is selected, i.e. chloride depression is selected. Generally, wide lattitude is allowed in selecting the degree of chloride depression via residual cupric concentration according to the particular end product specification; however, in the present invention it is preferred that the residual cupric concentration be at least about 0.5 g/l, more preferably about 0.5–5.0 g/l. Further, it is preferred that pH of the leach solution, just prior to dechlorination, be not greater than about 3, more preferably not greater than about 2. To suppress a strongly competing reaction wherein cuprous copper from Equation (2) reacts with dissolved oxygen to form cuprous oxide thereby greatly diminishing Equation (3), dechlorination must be conducted under inert atmosphere, which is preferably accomplished by bubbling an inert gas (such as nitrogen) through the solution. Alternatively, the solution may be preliminarily degassed (deoxidized) and then placed under inert atmosphere. It is preferred that the source of cupric ions at 22 be either cupric sulfate (nominally pentahydrate) or cupric oxide and that to enhance reaction rate the reactions be conducted at elevated temperature (suitably about 90° C. or greater). It is noted that typically a significant amount of cupric copper will initially be in solution arising from any copper constituent of the flue dust, in which case the cupric copper added in this step need only be sufficient in amount to bring the total cupric copper in solution to about 50% of that stoichiometrically required accordingly to cuprous concentration by Equations (2) and (3). Metallic copper is added at 22 in finely divided form (representatively −325 mesh) and in amount at least about equal to the amount of cupric copper added. The amount of cupric copper and the amount of metallic copper added each stoichiometrically equals about 50% of the amount of chloride present; however, it is preferred that additional metallic copper be added over the foregoing requirement (suitably 10%) to enhance reaction rate. After sufficient reaction time (representatively about 4–9 hours), the chloride precipitate is separated at 26 by conventional solid-liquid separation, such as filtration at 24. Prior to filtration, it is preferred to cool the solution to ambient. The clarified leach solution at 28 is then passed to Unit C for copper removal. To illustrate chloride removal according to the foregoing, metallic copper powder in slightly greater than stoichiometric amount by about 10% was added to the leach solution of the above sample material following adjustment of cupric concentration to about stoichiometric proportion via addition of cupric sulfate. The solution was stirred and heated to about 95° C., while bubbling nitrogen gas through the solution. After a contact time of about 5 hours, cuprous chloride precipitate was filtered. The filtrate had a final pH of about 2.5 while chloride concentration had been reduced by about 90%.

In Unit C, the dechlorinated leach solution is treated by cementation at 30 with zinc to remove residual copper left in excess along with other metallic impurities more noble than zinc. A representative equation of cementation is as follows:

$$Zn + CuSO_4 = ZnSO_4 + Cu_{(ppt)} \tag{4}$$

Zinc powder at 32 is added gradually with agitation to the leach solution while monitoring pH which will tend to approach 5.6 as a limit being the pH of zinc sulfate solution. The reaction rate may be enhanced by maintaining the solution at elevated temperature, suitably 60°–95° C. Upon further zinc addition producing no significant increase in pH, cementation is considered substantially complete. The copper precipitate is separated at 36 by conventional solid-liquid separation at 34, such as filtration; and the solution at 38 is passed to Unit D for iron removal.

In Unit D, iron is precipitated at 40 from the acidic leach solution primarily as hydrated ferric oxide by the addition of a strong oxidant and a neutralizer at 42, representatively according to the following equations:

$$FeSO_4 + \tfrac{1}{2}H_2O_2 + Ca(OH)_2 = FeOOH_{(ppt)} + CaSO_{4(ppt)} + H_2O \tag{5}$$

$$Fe_2(SO_4)_3 + 3Ca(OH)_2 = Fe_2O_3.H_2O_{(ppt)} + 3CaSO_{4(ppt)} + 2H_2O \tag{6}$$

Equation (5) will typically be the predominant reaction since most solubilized iron will be in the ferrous state. Essentially, acid-soluble ferrous iron is oxidized to ferric iron which is relatively insoluble in sulfuric acid. In practice, the oxidant (e.g. $H_2O_2$ as shown or $O_2$) is added to the leach solution in at least about stoichiometric amount. A neutralizer (e.g. lime as shown or other bases whose sulfate salts are relatively insoluble) is added as required to maintain pH acidic, preferably at least about 2, more preferably about 2–3.5. As seen from Equation (6), addition of the neutralizer also promotes removal of any ferric iron as hydrated ferric oxide or as a jarosite. An alternate stepwise procedure comprises adding oxidant incrementally while monitoring pH and adding neutralizer following each addition of oxidant to return pH to a reference value, and repeating the procedure until pH ceases to change significantly with further oxidant addition. The reaction may be conducted at elevated temperature, representatively 70°–95° C.

The foregoing process step is a variant of the Goethite and Jarosite Processes described in the articles, hereby incorporated by reference, "Improved Leaching Technologies in the Electrolytic Zinc Industry", 6B Metallurgical Transactions B 43 (1975) and "Removal of Iron From Leach Liquors by the Goethite Process", 2 Hydrometallurgy 25 (1976). When the reaction is substantially complete, the iron precipitate is separated at 36 by conventional solid-liquid separation at 34, such as filtration. The clarified leach solution at 38 is passed to Unit E for final treatment.

In Unit E, the substantially purified zinc-loaded leach solution is treated by crystallization at 50 to recover commercial grade zinc sulfate. Conventional methods of crystallization may be utilized; although evaporative crystallization is preferred considering high solubility of zinc sulfate, wherein suitably the solution is heated under vacuum. The product at 52 will be in the hydrated form, representatively $ZnSO_4.7H_2O$ when crystallization temperature is less than about 70° C.; however, it is preferred to conduct crystallization at least about 70° C. (the temperature at which the heptahydrate dehydrates to the monohydrate) to obtain $ZnSO_4.H_2O$, the usual commercial form. Optionally, the solution may be continuously filtered concurrently with evaporation for minor gradation in purity of the zinc product. The evaporated solvent is preferably recycled at 54 to the chlorine removal step in Unit B. To illustrate, the sample material noted above and treated substantially in accordance with the foregoing overall procedure was found to contain about 36.1% zinc which compares favorably with 36.4% theoretical zinc content of $ZnSO_4.H_2O$.

While preferred embodiments of the invention have been illustrated and described, it will be recognized by those skilled in the art that the invention may be otherwise variously embodied and practiced within the scope of the following claims:

What is claimed is:

1. A hydrometallurgical process for separative treatment of zinc-bearing metallurgical flue dust, comprising:
   (a) providing as a starting material a zinc-bearing flue dust containing significant amounts of lead, chlorine, and iron;
   (b) leaching said starting material in sulfuric acid solution of concentration at least about sufficient for substantially complete dissolution of soluble metal oxide constituents; then selectively adjusting the pH of the loaded leach solution to at least a sufficiently acidic condition corresponding to the selected extent of subsequent chloride removal; and separating undissolved residue from the leach solution; then
   (c) removing chloride from said leach solution to selected extent corresponding to said selected acidic pH by precipitating cuprous chloride while suppressing formation of cuprous oxide, cuprous ions being provided in at least stoichiometric amount by reduction in deoxidized solution of cupric ions with metallic copper, the ratio of metallic copper to cupric copper being at least about 1; and after sufficient reaction time separating precipitate from the leach solution; then
   (d) cementing residual copper from said solution with zinc powder; then
   (e) precipitating iron from said solution by the addition of an oxidant and a neutralizer in at least about stoichiometric amounts while maintaining pH of said solution acidic; followed by separating precipitate from said solution; and then
   (f) crystallizing zinc sulfate from said solution.

2. The process of claim 1 wherein said flue dust is white dust resulting in the smelting of copper.

3. The process of claim 2 wherein said smelting is of secondary copper.

4. The process of claim 1, 2, or 3 further provided that in step (b) acid concentration is initially about 100–300 g/l and said final pH is not greater than about 3.

5. The process of claim 1, 2, or 3 further provided that in step (b) the quantity of leach solution relative to the quantity of material treated is selected to substantially maximize the concentration of solubilized zinc sulfate.

6. The process of claim 1, 2, or 3 further provided that in step (b) final pH is adjusted such that residual cupric ion concentration following step (c) is at least about 0.5 g/l.

7. The process of claim 6 wherein residual cupric concentration is about 0.5–5.0 g/l.

8. The process of claim 7 wherein said leach solution is reacted in step (c) at elevated temperature and inert gas is bubbled through said solution during reaction.

9. The process of claim 8 wherein cupric ions are added to said solution in step (c) as cupric sulfate or cupric oxide.

10. The process of claim 1, 2 or 3 further provided that in step (d) zinc powder is added gradually until pH ceases to change significantly.

11. The process of claim 1, 2, or 3 further provided that in step (e) neutralizer addition is regulated to maintain pH within a selected range.

12. The process of claim 11 wherein pH is maintained in the range of about 2–3.5.

13. The process of claim 11 wherein said oxidant is hydrogen peroxide and said neutralizer is lime.

14. The process of claim 1, 2, or 3 further provided that in step (f) crystallization is by solvent evaporation.

15. The process of claim 14 wherein evaporated solvent is recycled to chlorine removal step (c).

* * * * *